United States Patent Office.

LA ROY F. GRIFFIN, OF NORTH GRANVILLE, NEW YORK.

COMPOSITION FOR WALL-COVERINGS.

SPECIFICATION forming part of Letters Patent No. 486,870, dated November 29, 1892.

Application filed November 22, 1889. Serial No. 331,255. (No specimens.)

*To all whom it may concern:*

Be it known that I, LA ROY F. GRIFFIN, of North Granville, county of Washington, and State of New York, formerly of Lake Forest, county of Lake, and State of Illinois, have invented a Composition for Covering Walls, of which the following is a specification.

In making the new substance I take about ten parts of waste sulphite liquor produced at the pulp-mills engaged in making wood fiber for paper by the so-called "sulphite process" and treat it with about three parts of common glue. The waste sulphite liquor is an unknown but very complex substance, containing all the materials of the wood used to produce the fiber, except cellulose, either in the state of a solution from the wood, the solvents being either sulphurous acid or one or both of the sulphites of magnesia or of lime or mixtures of the sulphites of magnesia and lime, or as new compounds so made—it is as yet uncertain which. The glue is added to this sulphite liquor and slowly warmed until dissolved. Usually as soon as cooled a small amount of a new gummy matter appears; but this again dissolves as the mass cools, when the whole becomes a jelly-like mass. This new substance possesses properties distinct from glue, and also from the sulphite liquor, and it is a new product produced by the chemical action of some constituent or constituents of the sulphite liquor upon the gelatine, which is the principal constituent of common glue. The proportions given may not be the exact proportions in which the new substance can be best made, since its chemical constitution has not yet been determined, nor has the composition of the spent sulphite liquor, but they are sufficiently close to produce the product without failure. I next take about thirty parts of calcium sulphate, about forty parts of clean sand, and about twelve parts of wood fiber, preferably in the form of sawdust and mix them intimately. If the calcium sulphate is not nearly pure, I then add about four parts of lime and its equivalent of sulphuric acid; but if the calcium sulphate is pure these are not needed. Finally, I add about eight parts of the compound made by the action of the glue upon the waste sulphite liquor and sufficient water to render the mixture plastic, so that it can be spread upon a wall in the ordinary way.

This wall-covering can be rendered harder and more dense by using less of the wood fiber or lighter and more elastic by increasing the amount. It hardens quicker if the wood fiber has first been dried on the outside; but this is not essential. It hardens through a chemical reaction between the calcium sulphate and the new substance first made, and at the same time it becomes tough and elastic. An outer coating possessing many of the same properties can be prepared by using calcium sulphate alone or calcium sulphate with a small proportion of lime and sand or of powdered marble united with the new substance first made.

Having thus described my invention, I claim as new and desire to protect by Letters Patent—

1. The process of making a covering for walls by adding glue to spent sulphite liquor, allowing it to stand until all resulting changes have been completed, and then adding sand, wood fiber, and sulphate of lime, substantially as described.

2. A composition for wall-covering, consisting of sand, wood fiber, sulphate of lime, and spent sulphite liquor to which glue has been added, substantially as described.

In testimony whereof I affix my signature, in presence of two witnesses, this 16th day of November, 1889.

LA ROY F. GRIFFIN.

Witnesses:
FRANK L. STEVENS,
AMBROSE RISDON.